C. T. Jerome,
Fire Annihilator
No. 2,839. Reissued Jan. 14, 1868.
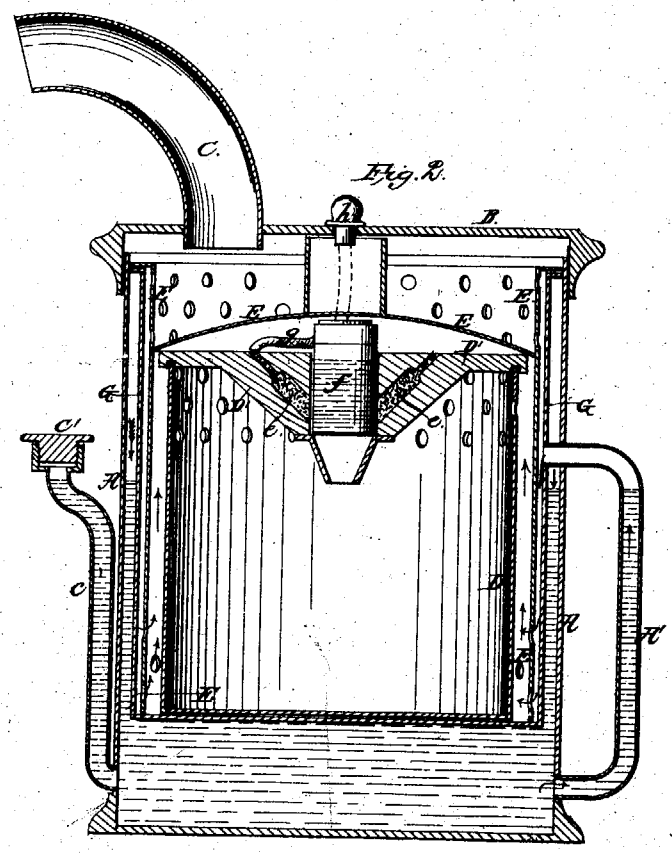
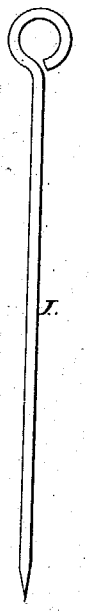
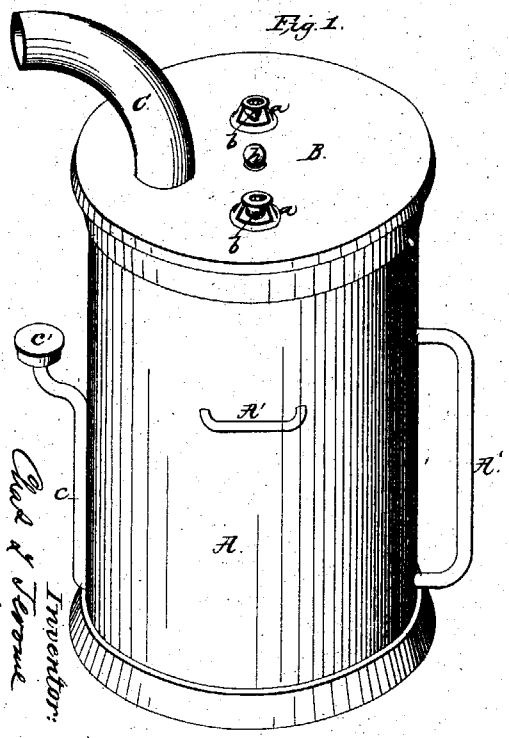
Witnesses:
Edw. Schofs
Chas. King Jr.
Inventor:
Chas. T. Jerome
by
Munn & Dennison & Lawrence

UNITED STATES PATENT OFFICE.

CHARLES T. JEROME, OF MINNEAPOLIS, MINNESOTA.

IMPROVEMENT IN FIRE-ANNIHILATORS.

Specification forming part of Letters Patent No. 66,498, dated July 9, 1867; Reissue No. 2,839, dated January 14, 1868.

*To all whom it may concern:*

Be it known that I, CHARLES T. JEROME, of Minneapolis, in the county of Hennepin and State of Minnesota, have invented an Automatic Fire-Annihilator; and I do hereby declare that the following is a full, clear, and exact description thereof, reference being had to the accompanying drawings, making a part of this specification, in which—

Figure 1 is a perspective view of the exterior of the apparatus. Fig. 2 is a diametrical section, exhibiting the interior construction of the apparatus.

Similar letters of reference indicate corresponding parts in the two figures.

This invention relates to an improved apparatus for and in a method of extinguishing fires by a rapid and copious generation of carbonic-acid gas, hydrochloric-acid gas, or other ga ous non-supporter of combustion in the immediate vicinity of a fire.

The object of my invention is to combine with an apparatus containing a substance or substances which will rapidly generate an anti-combustive gas a quick-match or fuse which will take fire at a low temperature and automatically produce the desired result, as will be hereinafter explained.

To enable others skilled in the art to understand my invention, I will describe one mode of carrying it into effect.

In the accompanying drawings, A represents a strong cylindrical vessel, which may be made of any desired capacity, and which is provided with a tightly-fitting cover, B, from which latter projects a pipe, C, as shown in Figs. 1 and 2. This vessel is constructed with double side and bottom walls formed by the outer wall, A, and interior wall, G, which leave a surrounding chamber for containing water, as shown in Fig. 2.

From a point near the bottom of the water-chamber a pipe, *c*, projects, extending upward and terminating in a cup-shaped socket in which is a tightly-fitting screw-plug, *c'*. Diametrically opposite the pipe *c* another pipe, A', is applied to the vessel A, outside thereof, which pipe forms a communication between the water-chamber and the interior of the vessel G, so that when the air above the water in said water-chamber is expanded by heat generated in vessel G more or less of the water will be forced upward through pipe A' into this vessel, for a purpose which will be hereinafter explained.

Within the vessel G is a cylinder, E, which is perforated at and near its upper and lower ends, and which is constructed with a cap or diaphragm, E', near its upper end, through the center of which is a small hole surrounded by a cylinder or tube that extends up to the cover B.

Within the cylinder E is a vessel, D, which is open at top, and which has a bridge-plate, D', supported upon its upper edge and suitably held in place thereon. This bridge D' is constructed with a central chamber for receiving a glass cup, *f*, and also with two inclined chambers, *e e*, communicating with said cup-chamber for containing gunpowder or other substance which will answer the same purpose. Three holes are made through the cover B of the vessel A, two of which have open cages or guards *a a* covering them, while the other receives a plug, *h*, which is directly over the central hole through the diaphragm E', and also over the center of the glass cup *f* in the bridge-plate D', as shown in Fig. 2.

The apparatus is charged by introducing a compound into the vessel D, consisting of refined saltpeter, one hundred parts; charcoal, eighteen parts; sulphur, sixteen parts; whiting, thirty-three and a half parts, which are finely powdered and thoroughly mixed. Upon this compound is placed a mixture consisting of chlorate of potassa, twenty-eight and a half parts, by weight, and ten parts of loaf-sugar, finely powdered and thoroughly mixed. I then charge the chambers *e e* with gunpowder or some other explosive compound and introduce sulphuric acid into the glass vial *f*, which vial is then corked, as shown in Fig. 2. Water being introduced into the water-chamber between the inner vessel, G, and outer vessel, A, the apparatus is ready for receiving the fuses.

The fuses or quick-matches consist of a string powder-fuse, *g*, tipped with a composition which will ignite at a low temperature. This substance may consist of the following ingredients: For the first coating, chlorate of potassa, twenty-eight and one-half parts; loaf-sugar, ten parts, well powdered and mixed with an equal bulk of shellac and alcohol; for the second coating, glue, ten parts; phosphorus, fifteen parts; chlorate of potassa, ten parts; whiting, three parts; water, a sufficient quantity to make a stiff paste; for the third coating, paraffine, eight parts; lard, six parts. The matches or fuses thus prepared are passed down through the holes through the cover B and their prepared tips *b* drawn within the guards *a a*, as shown in Fig. 1, so that these guards will protect them from injury. The lower ends of the fuses are then arranged over or in the vent-holes of the powder-chambers *e e* and the apparatus arranged in a suitable position for use.

Should a fire occur in an apartment with the above-described apparatus in it, and the temperature be raised to about 112° Fahrenheit, the fatty matter covering the inflammable tips on the fuses will be melted and said substance exposed to the heat and air, which will ignite it, and thus communicate fire to the powder in chambers *e e*. The explosion thus produced will shatter the glass vial *f* and precipitate the acid therein upon the compound in the vessel D. A drop of the acid will ignite the mixture of chlorate of potassa and sugar, which in turn will ignite the gas-generating compound. As considerable heat will be generated by the chemical action in vessel D, it is desirable to reduce the temperature as much as possible, for which purpose the heat will rarefy the air above the water in the external chamber, and thus cause water to flow into the passage between the walls G and E.

If at any time it is desired to produce the gas without having the fuses to operate, the pointed wire rod I may be forcibly plunged through the hole covered by the plug *h* into and through the glass vial *f*, thus effecting the desired result.

The anti-combustive gas may be generated otherwise than by combustion—viz., by precipitating sulphuric acid or other suitable acid in considerable quantities, or bicarbonate of soda, marble-dust, or other substances, either in a natural state or mixed with water. Carbonic-acid gas or hydrochloric-acid gas may be generated, according to the substances used; and, if desirable, a gas-generating compound may be ignited by direct connection with a fuse without giving any alarm.

I do not confine my invention to the precise form of apparatus herein described, as other forms may be adopted which will answer the same end. Nor do I confine myself to the within-described ingredients used in the manufacture of the matches and in producing a gaseous non-supporter of combustion.

I am aware that fuses or quick-matches which would take fire spontaneously at a low temperature have been employed in conjunction with alarms in such manner as to sound an alarm upon the breaking out of a fire, and therefore I do not claim this feature as my invention, although it may be adopted in connection therewith.

I do not claim aerated or carbonic-acid water for extinguishing fires, as this, I am informed, has been patented in this country and in France; but while I do not claim the same I wish it to be understood that my invention is applicable to machines for extinguishing fires by means of aerated or carbonic-acid water and compounds and solutions which act and can be acted upon on the principle described; therefore, Having described my invention, what I claim as new, and desire to secure by Letters Patent, is—

1. The application of a quick match, or its equivalent, which will take fire at a low temperature, to an apparatus for extinguishing fires by the injection upon the same of a gaseous or a liquid non-supporter of combustion, substantially as described.

2. Preparing the ends of the quick-matches with a composition composed of the within-described ingredients mixed together in about the proportions set forth.

CHAS. T. JEROME.

Witnesses:
L. M. STEWART,
CHAS. S. PLUMMER.